US005782331A

United States Patent [19]
Bailly et al.

[11] Patent Number: 5,782,331
[45] Date of Patent: Jul. 21, 1998

[54] LOCK-SYNCHRONISIED GEARBOX SHIFT SYSTEM

[75] Inventors: Gerhard Bailly; Detlef Baasch; Ünal Gazyakan, all of Friedrichshafen, Germany

[73] Assignee: ZF Friedrichshafen AG, Friedrichshafen, Germany

[21] Appl. No.: 586,644

[22] PCT Filed: Jul. 19, 1994

[86] PCT No.: PCT/EP94/02373

§ 371 Date: Jan. 22, 1996

§ 102(e) Date: Jan. 22, 1996

[87] PCT Pub. No.: WO95/03496

PCT Pub. Date: Feb. 2, 1995

[30] Foreign Application Priority Data

Jul. 23, 1993 [DE] Germany ............ 43 24 814.4

[51] Int. Cl.$^6$ ................................. F16D 23/06
[52] U.S. Cl. ................... 192/53.32; 192/53.33; 192/53.34; 192/53.35; 192/53.51; 74/339
[58] Field of Search ................ 192/53.3, 53.32, 192/53.33, 53.34, 53.35, 53.51; 74/339

[56] References Cited

U.S. PATENT DOCUMENTS

| 2,394,098 | 2/1946 | Peterson et al. ............... 192/53.35 |
| 2,753,728 | 7/1956 | Kelbel ....................... 192/53.51 X |
| 4,271,943 | 6/1981 | Kuzma . | |
| 4,770,280 | 9/1988 | Frost . | |

FOREIGN PATENT DOCUMENTS

| 0144962 | 6/1985 | European Pat. Off. . |
| 0160903 | 11/1985 | European Pat. Off. . |
| 0221039 | 5/1987 | European Pat. Off. . |
| 0267714 | 5/1988 | European Pat. Off. . |
| 2459901 | 1/1981 | France . |
| 680423 | 8/1939 | Germany . |
| 1502346 | 3/1978 | United Kingdom . |
| 2065800 | 7/1981 | United Kingdom . |
| 2184177 | 6/1987 | United Kingdom . |

*Primary Examiner*—Richard M. Lorence
*Attorney, Agent, or Firm*—Davis and Bujold

[57] ABSTRACT

The invention concerns gearshift transmissions with a lock synchronization arrangement in which one synchronizer member, connected with a transmission shaft and at least one gear wheel rotating at a different speed, can be coupled together during synchronous speed by means of an annular sliding sleeve axially movable by a gearshift force. Coupling teeth of the sliding sleeve mesh with corresponding coupling teeth of each rotating gear wheel or of a clutch member connected with each rotating wheel. Between the sliding sleeve and each rotating gear wheel is situated one synchronizer ring, parts of said synchronizer ring forming, with parts connected with the gear wheel or provided thereon, a positively engaged coupling. In the absence of synchronism, the axial movement of the sliding sleeve is locked by blocking surfaces of locking teeth. The coupling teeth are stub-ended coupling teeth which are dampened by elastic elements. The axial shifting movement is terminated when the stub-ended coupling teeth butt upon each other. The gearshift stroke is shortened. The so-called "2nd point" in the gearshift cycle is no longer perceivable for the driver. Different embodiments are proposed.

28 Claims, 16 Drawing Sheets

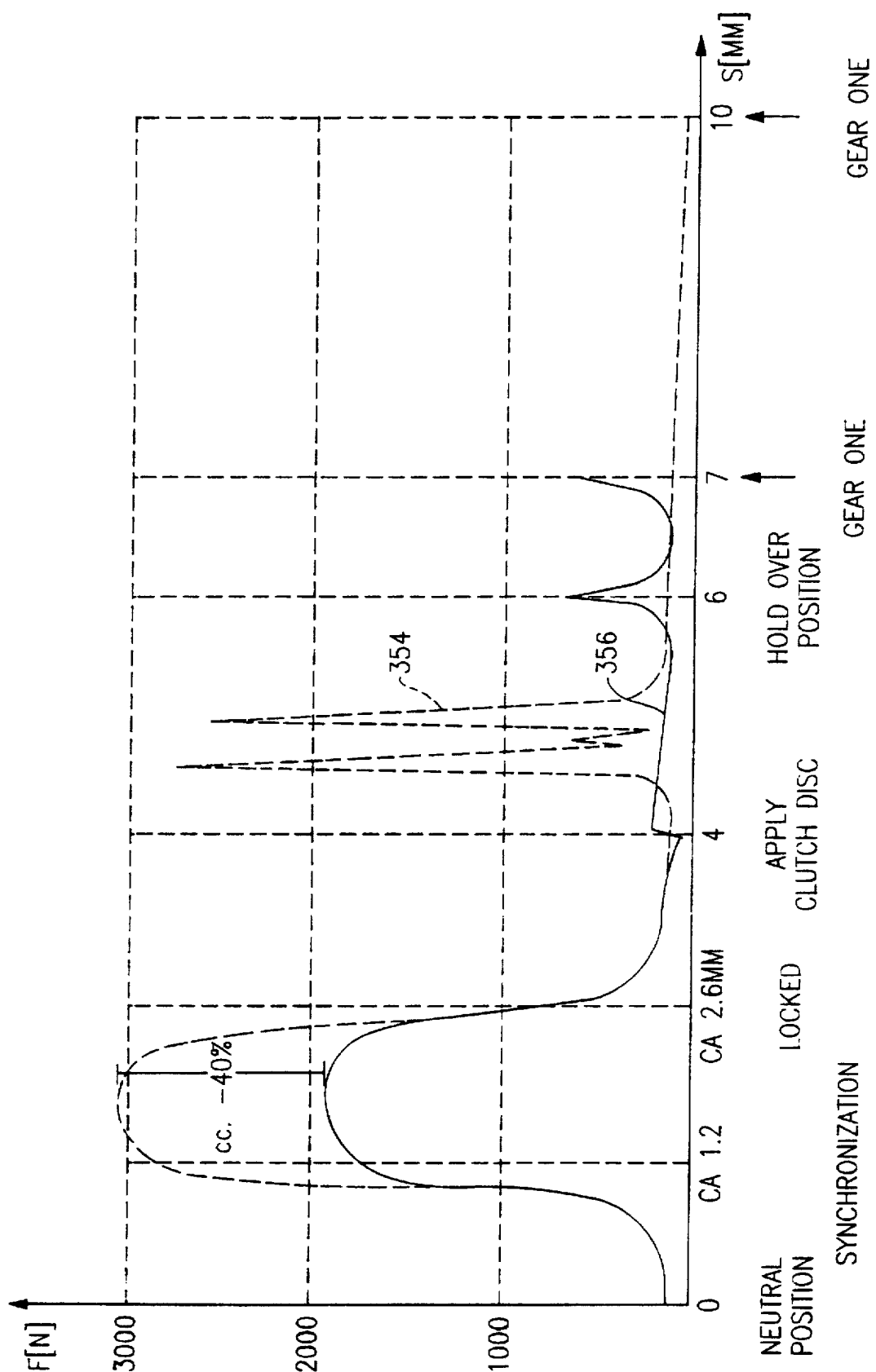

LOCK-SYNCHRONISED GEARBOX SHIFT SYSTEM

The invention concerns a transmission shift system with a lock synchronizing arrangement.

BACKGROUND OF THE INVENTION

For transmission of the driving power and adaptation of the engine torque to the required traction of a vehicle, multi-step gearshift transmissions are being practically exclusively used today.

The shift system can be considerably simplified by means of a synchronizing mechanism. In the synchronization, the torque adaptation of the transmission elements to be interconnected can be automatic or controlled in order to prevent double clutching when upshifting or double clutching with actuating the throttle when downshifting. The driving security is clearly increased, since quick, reliable and also noiseless gear changing is possible even in critical driving situations.

In the synchronized vehicle transmissions existing at present, synchronizing mechanisms are predominantly used for each individual gear.

The lock synchronization with taper adapter is widely propagated. In this system friction cones adapt to each other with positive engagement of the speeds of the transmission elements to be connected. This type of synchronization is used for transmissions both in passenger cars and in commercial vehicles.

Such a lock synchronization has been disclosed, for example, in "ZF-B-Sperr-synchronisierung"—publication 42290/R 2964-367 of March 1967.

The lock synchronization there described has a synchronizer ring provided with outer teeth which, when shifting, is pressed against the friction cone of the clutch member and turns until reaching detents on the synchronizer member in relation to a sliding sleeve. Thereby the chamfered tooth front surfaces of locking teeth of the synchronizer ring press against those of the sliding sleeve thus preventing further movement of the sliding sleeve. Only when the friction cone surfaces have produced the synchronous speed of the parts to be coupled, will the synchronizer ring be turned back under the constant pressure of the sliding sleeve through the facets of the teeth front faces. The lock is thus released and gearing teeth of the sliding sleeve are inserted in the teeth of the clutch member.

When idling, the sliding sleeve is in an axial central position. Springs compress the stop bolts in detents of the sliding sleeve. The idle wheels can freely rotate on their shafts. The speed difference between the synchronizer ring and the clutch member, and the drag torque between the friction surfaces thereof, causes the synchronizer ring to turn relative to the sliding sleeve and thus blocks a gear shift.

In a locking position, the sliding sleeve has first pushed the synchronizer ring toward the friction cone of the clutch member via the stop bolts and pressure pieces. The teeth front faces have thus passed the gearshift force from the sliding sleeve directly to the synchronizer ring. As long as a speed difference exists between the synchronizer ring and clutch member, the friction torque on the friction cone surfaces of the synchronizer ring and clutch member is stronger than the restoring torque through the chamfered teeth front faces. The sliding sleeve is therefore locked against extending into the clutch member.

Only when the speed difference between the synchronizer ring and clutch member has been equalized and the friction torque thus removed, does the sliding sleeve rotate the synchronizer ring back to the "tooth on tooth gap" position. The sliding sleeve is then inserted via the locking teeth of the synchronizer ring into the likewise front-side chamfered teeth of the clutch member.

SUMMARY OF THE INVENTION

Departing from this prior art, the problem to be solved by this invention is to obtain, with short shift strokes and slight shifting forces, a great locking security and an improved driving feel with a uniform shifting force cycle.

The problem is solved by transmission shift systems with lock synchronization having the claimed features.

The coupling teeth of the known synchronization mechanisms have facets which make the meshing operation possible. Since the position of the teeth of the gearshift sleeve and clutch member relative to each other is accidental, the free rotary mass in the transmission must be turned prior to positively engaging the connection, in such a manner that the coupling teeth reach a position adequate for meshing.

The coupling teeth of the lock synchronization arrangement proposed in the invention have absolutely no facets. The probability of the teeth of the sliding sleeve and clutch member being before each other in a position capable of meshing is very remote and also is not favored due to the lack of facets. In order, in spite of this, to impart to the vehicle driver the impression that the gearshifting operation is developing as usual, the coupling teeth are dampened and can soften the axial gearshift pressure. In the gearshift end position, the gearshift mechanism can be stopped by a ratchet device so that the tightened spring remains tightened even after release of the gearshift lever by the driver and elimination of the axial gearshift pressure.

Said ratchet device is formed, for example, by stop bolts with compression springs retained in the synchronizer member of the synchronizing arrangement. They retain the axially movable sliding sleeve both in a neutral central position and in the momentarily desired end position in the engaged gear.

The front teeth of the coupling teeth provided for torque transmission are thus, with great probability, butting under prestress of the spring after the driver terminates the gearshift operation.

If a meshing has accidently occurred already, then the gearshift operation has been completely terminated. Otherwise, in the state of the teeth butting under stress, the vehicle clutch is closed and the building up of torque turns the teeth against each other. The teeth then mesh and the gearshifting is terminated. A premature turning of the teeth against each other and a subsequent meshing are also made possible by drag torques on the wheel set of the transmission.

If a direct intermeshing of the coupling teeth has been obtained, or if the meshing can be so quickly effected that no stopping is needed since the gearshift force still outcrops, then a ratchet device can be eliminated. The existing drag torques in a transmission shift system often make said direct meshing possible. If the drag torques are not sufficient, then the ratchet device is needed, since the gearshift force, as long as exerted by the driver, no longer outcrops and the meshing takes place only with the engagement of the clutch. If the gearshifting, for example, is not carried out manually by the driver via the gearshift linkage, then the alternative of an automatic shift by gearshift means remotely controlled by the driver is possible. The remote control here can take place by intercalation of a logical control which takes control on the engageable gearshift steps. An automatic system not controlled by the driver can also assume the whole shifting of the gearshift transmission, the shifting being preferably always to the optimal ranges. Pneumatically or electrically controlled gearshift means are predominantly used as gearshift means.

Due to the elimination of the meshing facets on the coupling teeth, the gearshift stroke is shortened in comparison with the known synchronization mechanisms. This gain can be used to enlarge the ratio between the gearshift lever and coupling teeth. The gearshift force required can thereby be definitely reduced.

BRIEF DESCRIPTION OF THE DRAWINGS

The invention is explained in detail with reference to the figures. They show:

FIG. 9 is a graph showing a cycle of the gearshifting force plotted over the gearshift stroke;

DESCRIPTION OF THE PREFERRED EMBODIMENT

Figure 1:
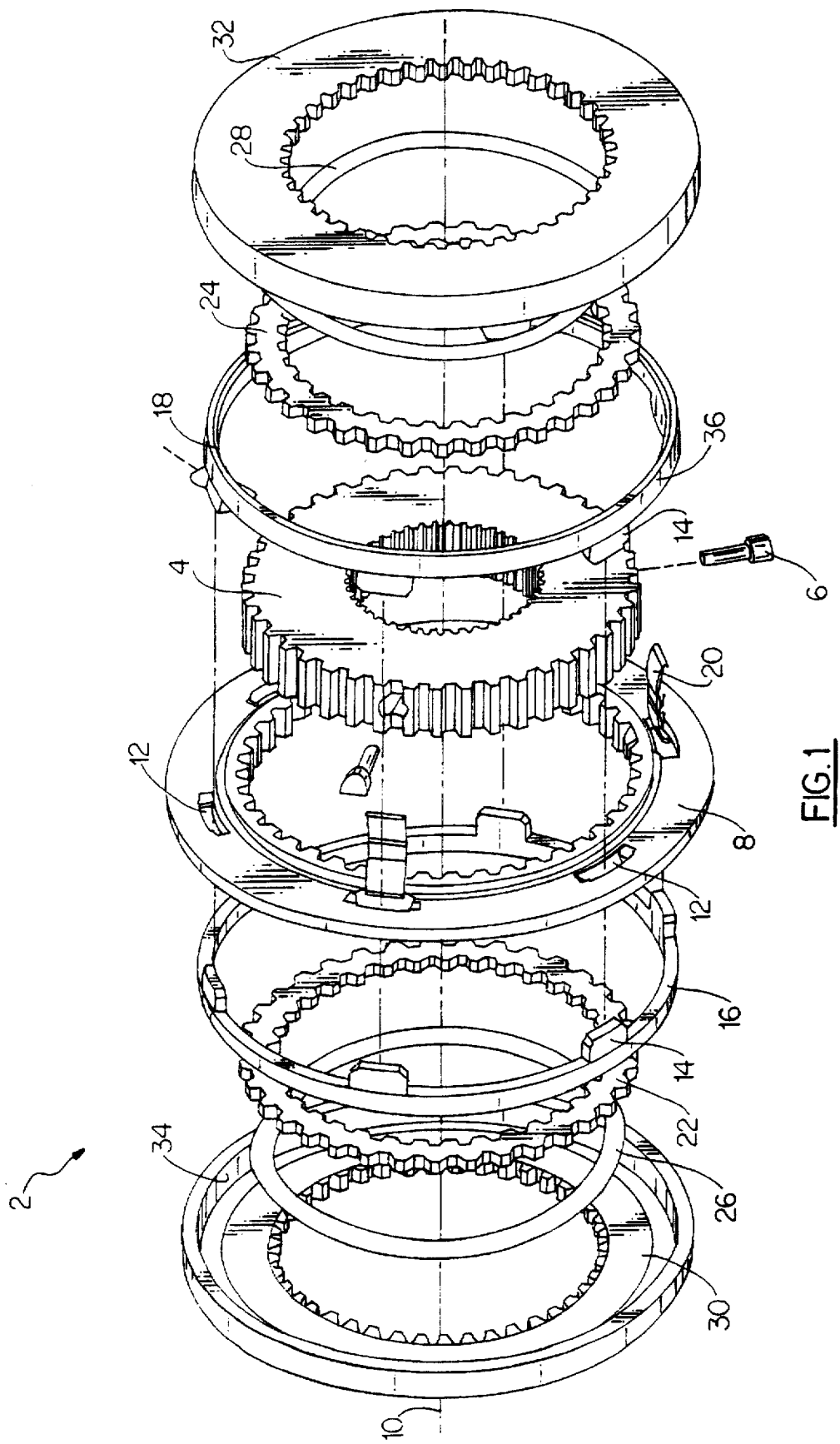
FIG. 1 A diagrammatic exploded view of the transmission shift system according to the invention.

FIG. 1 shows in an advantageous embodiment an exploded view of the transmission shift system 2 according to the invention. Stop bolts 6 are distributed on the periphery of a synchronizer body 4. The stop bolts are dampened by elastic elements not shown here which are provided in the synchronizer body 4. Here are shown, by way of example, three stop bolts 6 distributed at equal angles on the periphery of the synchronizer body 4. The stop bolts 6 mesh with notches in a sliding sleeve 8 that surrounds the synchronizer body 4. Said notches mark the central position of the sliding sleeve in a neutral position. The outer teeth of the synchronizer body 4 correspond to the inner teeth of the sliding sleeve 8, said sliding sleeve 8 being movable in both directions from the neutral position on the synchronizer body 4 along an axis 10. The other stub ends of the inner teeth of the sliding sleeve 8 have facets, only in the areas of the stop bolts 6, on which the stop bolts 6 can abut in the momentary end position of the sliding sleeve 8. The synchronizer body 4 itself has inner teeth by which it is situated axially and non-turnably in a peripheral direction upon a shaft, also not shown here.

The sliding sleeve 8 has on its periphery several recesses 12. With said recesses 12 correspond several projections 14 of two inner synchronizer rings 16 and 18. One projection 14 of the synchronizer ring 16 and of the synchronizer ring 18, respectively, projects through one recess 12 of the sliding sleeve 8, the projections 14 of both synchronizer rings 16 and 18 being joined, such as by welding. In at least a few of the recesses 12 of the sliding sleeve 8, a leaf spring 20 is also placed adjacent the projections 14. The leaf spring 20 has a notch in which lies, in a neutral position, one edge of the recess 12 of the sliding sleeve 8. The leaf spring 20 meshes in both inner synchronizer rings 16 and 18 so that the leaf spring 20 is fixed in the recess 12 on one side by the inner synchronizer rings 16 and 18 and on the other by sliding sleeve 8. The recesses 12 are also advantageously distributed at equal angles on the periphery of the sliding sleeve 8, it being possible to provide the recesses 12, which also lodge the leaf springs 20, over the recesses for the stop bolts 6. An arrangement of six recesses 12 has proved to be an advantageous embodiment.

Figure 2A:
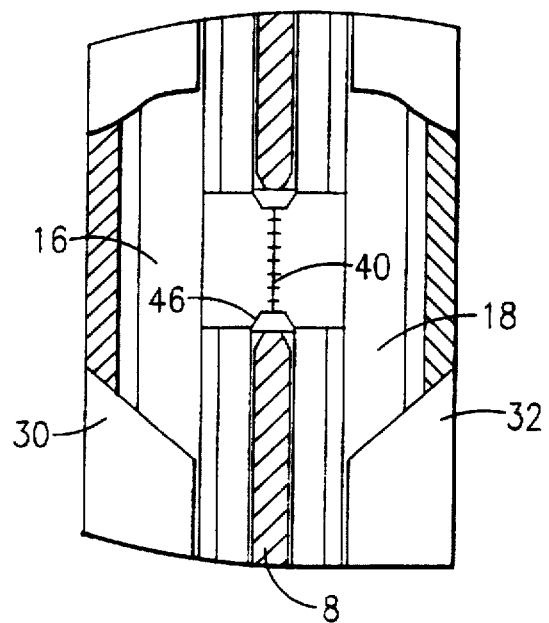
FIG. 2A is a fragmented circumference cross sectional view of the transmission shift system of the invention in its neutral position, along section line 2A—2A of FIG. 2B.
Figure 2B:
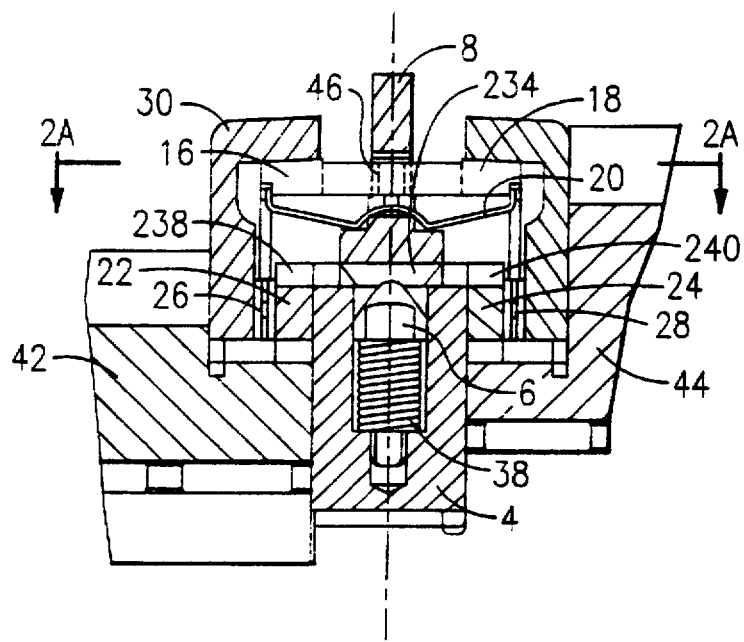
FIG. 2B is a fragmented cross-section of transmission shift system in its neutral position.
Figure 2C:
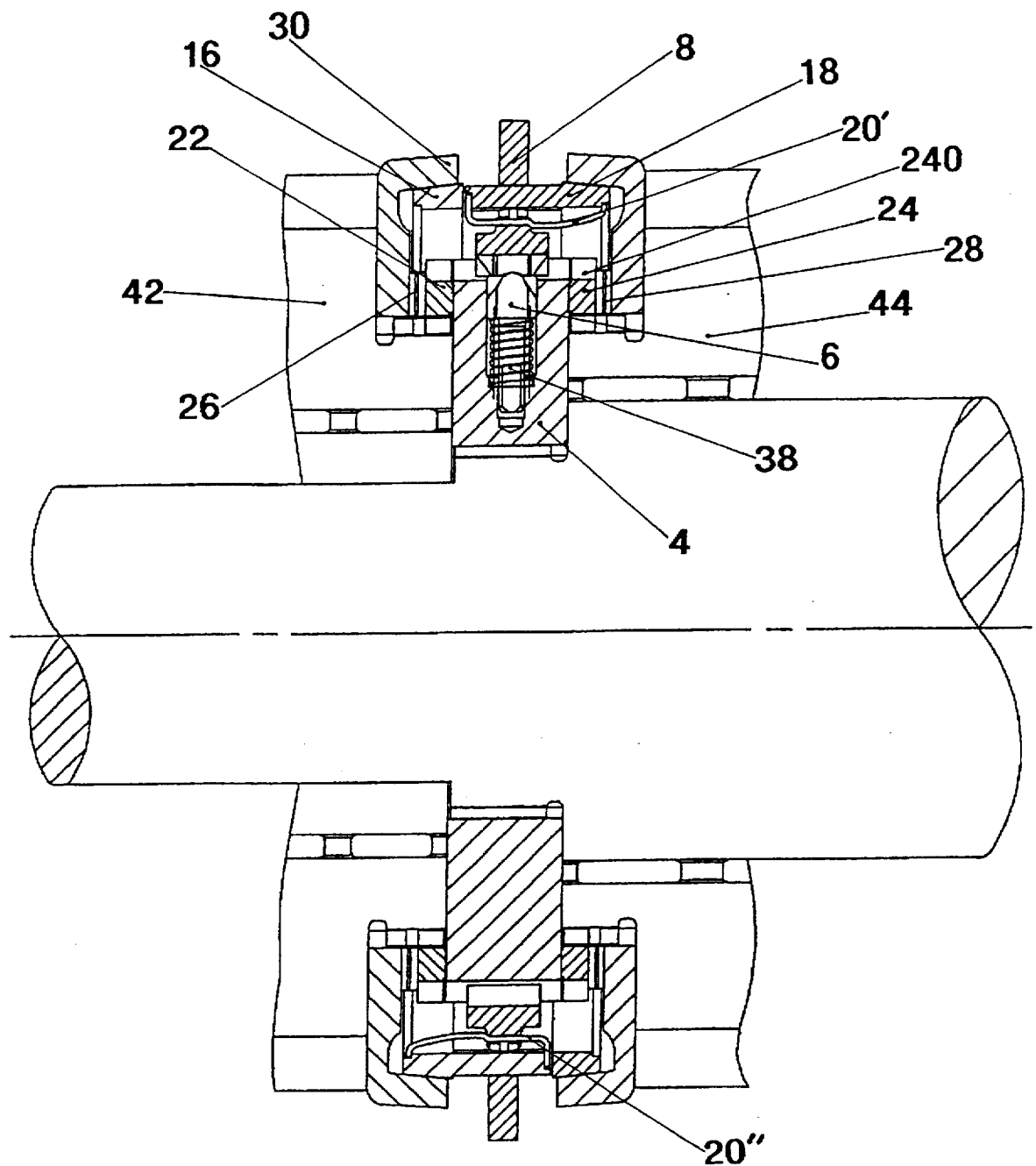
FIG. 2C is an embodiment where synchronizer rings are not interconnected.

FIG. 2C shows an embodiment where the synchronizer rings 16 and 18 are not interconnected. In this case, for each synchronizer ring 16, 20 one annular spring 20' and 20" is provided. Since both synchronizer rings are actuated and work independently of each other, they do not reciprocally influence each other by drag torques and mass inert torques so that the locking and shifting characteristics are improved. Besides, the manufacture becomes more economical and the assembly is simplified.

A respective clutch member 22 and 24 abuts each side of the synchronizer body 4. The clutch members 22 and 24 have outer teeth corresponding to the outer teeth of the synchronizer body 4 and to the inner teeth of the sliding sleeve 8. The clutch members 22 and 24 likewise have inner teeth which correspond to outer teeth not shown here of a gear wheel to be coupled. The clutch members 22 and 24 with their inner teeth are provided here with light axial play on the outer teeth of the gear wheel. None of the teeth here has facets or flattenings.

On each side of the clutch members 22 and 24 remote from the synchronizer member 4 is attached a respective corrugated spring 26 and 28 and a respective outer synchronizer ring 30 and 32. The outer synchronizer rings 30 and 32 have inner teeth corresponding to the outer teeth of the gear wheels not shown here. The outer synchronizer rings 30 and 32 also have on their outer edge inwardly and conically extending friction surfaces 34.

During the synchronization operation, the inward friction surfaces 34 form, with outward friction surfaces 36, a positively engaged connection on the inner synchronizer rings 16 and 18.

The above described transmission shift system needs only a small axial installation space.

In FIG. 2 the transmission shift system of the invention is represented in section in its neutral position. FIG. 2A shows a perspective turned by 90° relative to the representation in FIG. 2B so that in FIG. 2A the sliding sleeve 8 and parts of the outer synchronizer rings 30 and 32 are shown in section. This form of representation is repeated in the figures that follow.

Stop bolts 6 with compression springs 38 retain, in a central position, the sliding sleeve 8 which is axially movable upon the synchronizer body 4. Three such stop bolts 6 are preferably distributed at equal angles on the periphery of the synchronizer body 4 (see FIG. 1). The connected inner synchronizer rings 16 and 18, the connection of which is shown here as welded seam 40, are retained by leaf springs 20 in a central position relative to the sliding sleeve 8. The clutch members 22 and 24 are compressed with a slight force against the synchronizer body 4 by elastic elements such as corrugated springs 26 and 28, the synchronizer body 4 serving as a stop to the clutch members 22 and 24. The outer synchronizer rings 30 and 32 are compressed against the gear wheels 42 and 44 in the same manner. The locking teeth 46 of the transmission shift system 2 are provided on the different projections 14 on the inner synchronizer rings 16 and 18. The locking teeth are distributed on the periphery of the inner synchronizer rings 16 and 18 as many times as the projections 14 are provided.

Figure 3A:
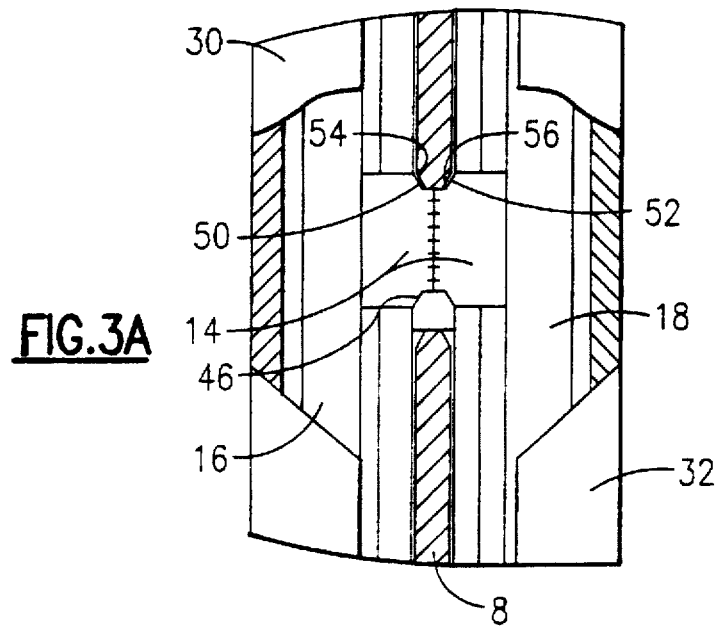
FIG. 3A is a fragmented circumference cross sectional view of the transmission shift system of the invention in its locking position, along section line 3A—3A of FIG. 3B.
Figure 3B:
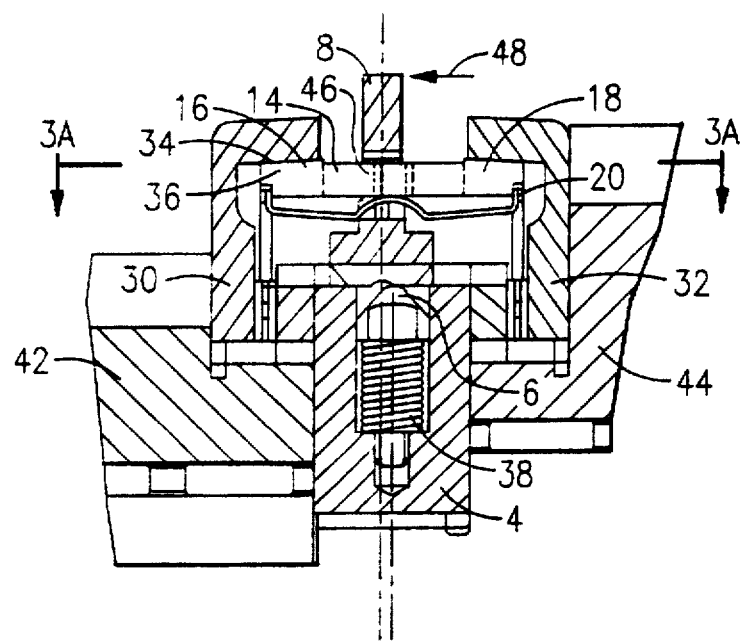
FIG. 3B is a fragmented cross-section of transmission shift system in its locking position.

FIG. 3 shows how the locking position is produced on the transmission shift system 2. FIG. 3A shows the sliding sleeve 8 and one part of the outer synchronizer rings 30 and 32 in section.

When the sliding sleeve 8 is moved by a gearshift force 48, the interconnected inner synchronizer rings 16 and 18 are moved along. With the presettable force of the leaf springs 20, the friction surface 36 of the inner synchronizer ring 16 is pressed against the friction surface 34 of the outer synchronizer ring 30. The leaf springs 20 are deformed in an axial relative direction between inner synchronizer rings 16, 18 and sliding sleeve 8. Due to the resulting tension and the corresponding spring geometry, an axial force results with which the inner synchronizer ring 16 is pressed against the outer synchronizer ring 30. As a consequence of the speed difference between outer synchronizer ring 30 and inner synchronizer ring 16, the inner synchronizer ring 16 is turned relative to the sliding sleeve 8. The locking teeth 46 form, in the area of the butting projections 14 of the synchronizer rings 16 and 18, locking flanks 50 and 52 which correspond to locking flanks 54 and 56 of the sliding sleeve 8. While the locking position is being produced, the locking flanks 50 on the inner synchronizer ring 16 butt upon the corresponding locking flanks 54 of the sliding sleeve 8. The angles of the locking flanks 50 and 54 are designed so that further movement of the sliding sleeve 8 relative to the inner synchronizer rings 16 and 18 is not possible before the difference of speed between outer synchronizer ring 30 and inner synchronizer ring 16 is almost zero. When the sliding sleeve moves, the stop bolts 6 are pressed back against compression springs 38 into their recesses in the synchronizer body 4.

Figure 4A:
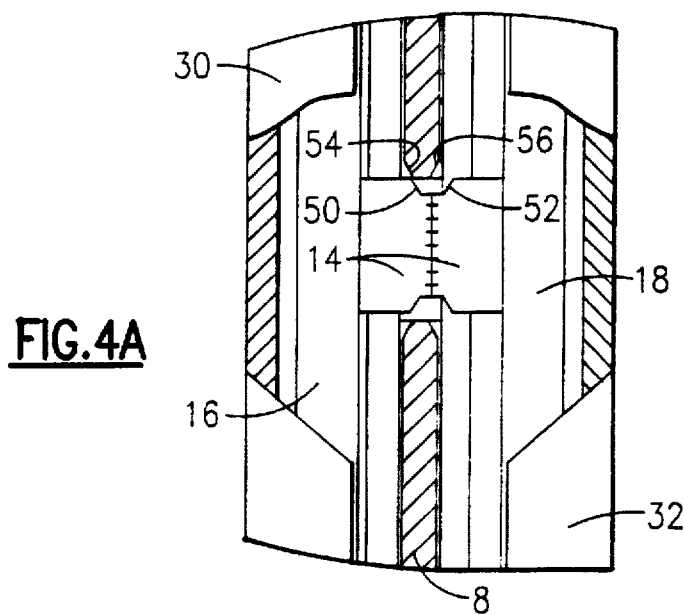
FIG. 4A is a fragmented circumference cross sectional view of the transmission shift system of the invention in its unlocking position, along section line 4A—4A of FIG. 4B.
Figure 4B:
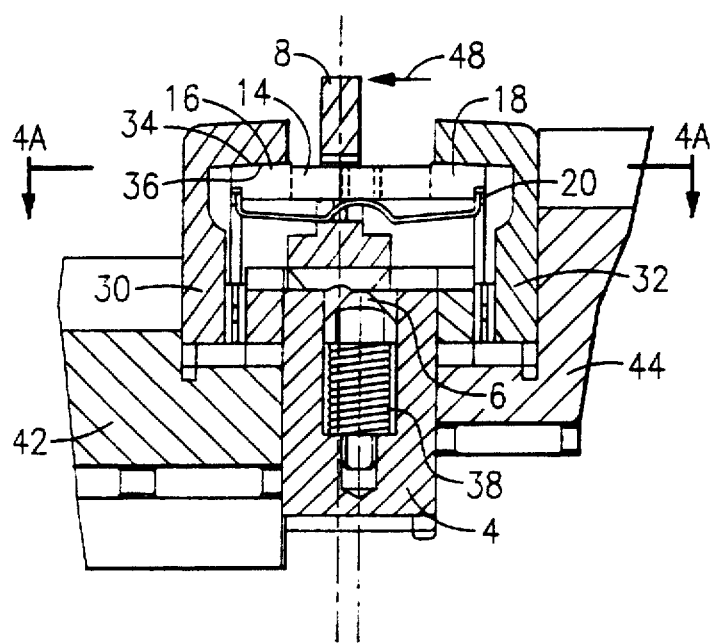
FIG. 4B is a fragmented cross-section of transmission shift system in its unlocking position.

While the speed between the outer synchronizer ring 30 and the inner synchronizer ring 16 is equal, further movement of the sliding sleeve 8 is possible with a simultaneous turning of the inner synchronizer rings 16 and 18. The locking flanks 50 and 54 detach themselves from each other. FIG. 4 shows such an unlocking. The stop bolts 6 remain in their turned back position in the recesses of the synchronizer body 4.

Figure 5A:
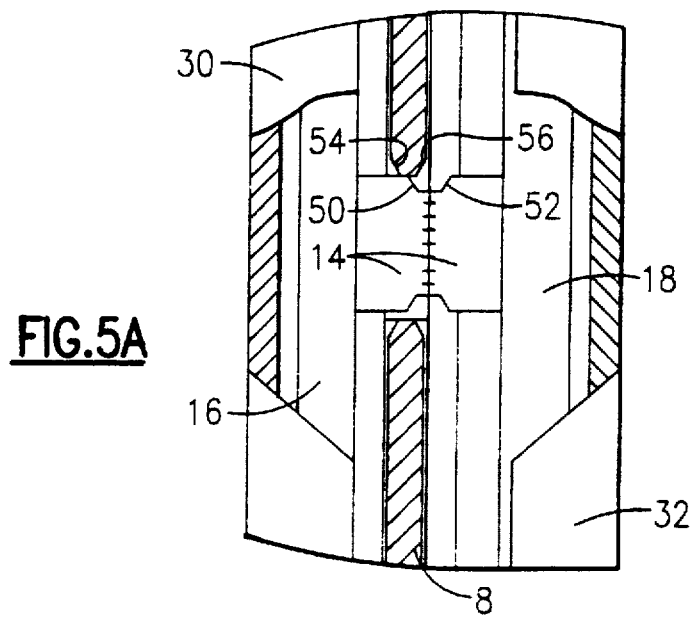
FIG. 5A is a fragmented circumference cross sectional view of the transmission shift system of the invention showing the butting of the sliding sleeve on the clutch member, along section line 5A—5A of FIG. 5B.
Figure 5B:
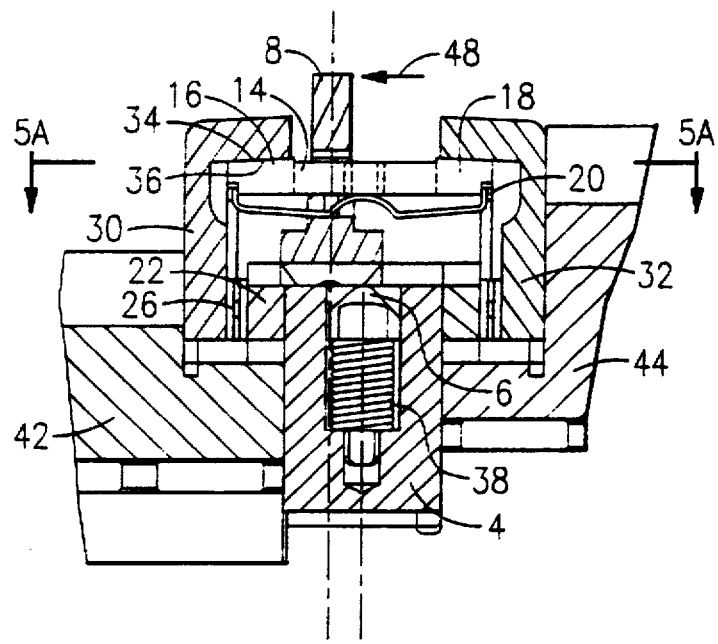
FIG. 5B is a fragmented cross-section of transmission shift system showing the butting or the sliding sleeve on the clutch member through a stop pin starting at the inner teeth of the synchronizing body and going through to the outer edge of the sliding sleeve.

FIG. 5 shows the butting of the sliding sleeve 8 on the clutch member 22. Upon further extending of the sliding sleeve 8 due to the exerted gearshift force 48, a force is exerted by the leaf springs 20 on the friction surfaces 34 and 36 of outer and inner synchronizer rings 30 and 16 in order to counteract the generation of a speed difference between outer synchronizer ring 30 and inner synchronizer ring 16 and thus between clutch member 22 and sliding sleeve 8.

After a total shifting stroke of about 4 mm the inner teeth of the sliding sleeve 8 butt upon the outer teeth of the clutch member 22. If no immediate mesh occurs, the clutch member 22 can be axially moved by the sliding sleeve 8 against the tension of the corrugated spring 26, at a maximum until the clutch member 22 butts on the outer synchronizer ring 30.

When this position of the sliding sleeve 8 is reached, the gear is engaged for the driver, even though no positively engaged connection has been produced between clutch member 22 and sliding sleeve 8. The retaining force needed in this position against the corrugated spring 26 is applied by the stop bolt 6 (see FIG. 6). The stop bolt 6 is pressed by the compression spring 38 with a presettable force against the facet 50 on the sliding sleeve 8. The axial force generated thereby must correspond to at least the force 58 of the corrugated spring 26.

Figure 6A:
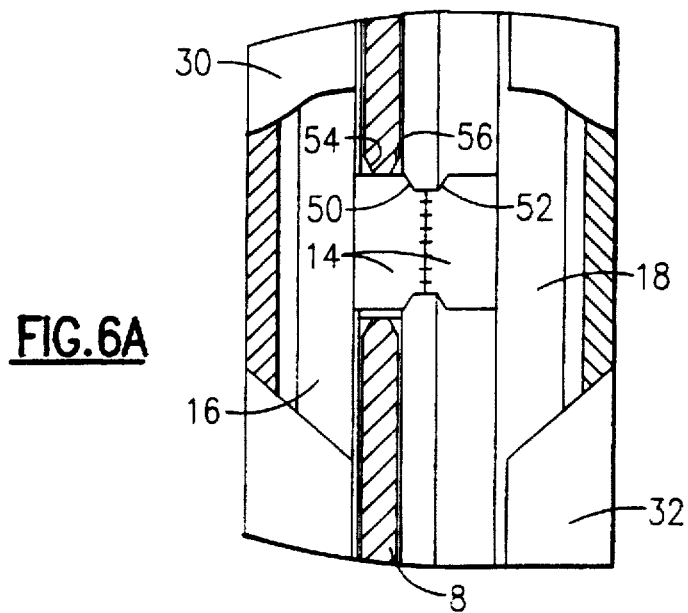
FIG. 6A is a fragmented circumference cross sectional view of the transmission shift system of the invention in a retaining a position, along section line 6A—6A of FIG. 6B.
Figure 6B:
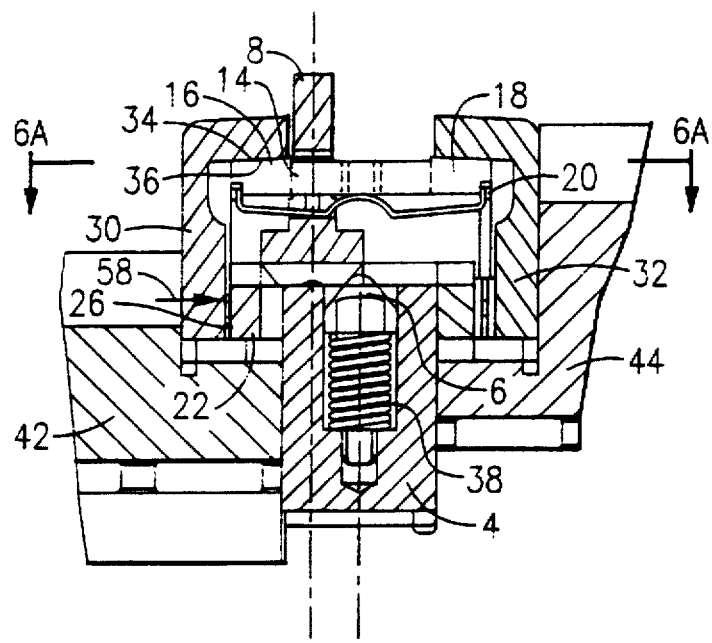
FIG. 6B is a fragmented cross-section of transmission shift system in the retaining position.

In the retaining position of FIG. 6, the sliding sleeve 8 is still at a distance of about 1 mm from its end stop. Thus, the driver is given the possibility of pressing the sliding sleeve 8 with increased shifting force 48 upon the clutch member 22. This "emergency control" is needed when, due to errors in the synchronizing mechanism, an excessively elevated speed difference has been generated between clutch member 22 and sliding sleeve 8 which does not make possible, with the force of the corrugated spring 26, a meshing of the outer teeth of the clutch member 22 in the inner teeth of the sliding sleeve 8.

Figure 7A:
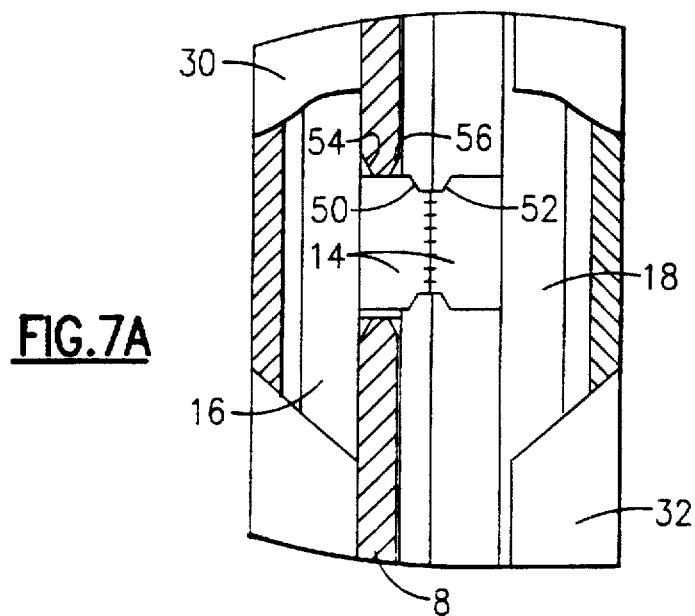
FIG. 7A is a fragmented circumference cross sectional view of the transmission shift system of the invention when engaged with a gear, along section line 7A—7A of FIG. 7B.
Figure 7B:
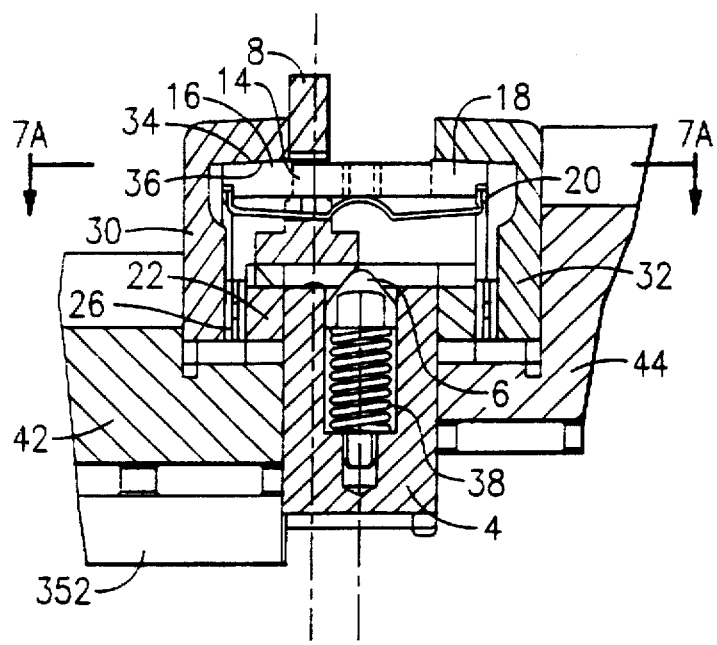
FIG. 7B is a fragmented cross-section of transmission shift system of the invention when engaged with a gear.

Due to power loss or clutch torques, there results a difference of speed between clutch member 22 and sliding sleeve 8 which allows a meshing of the teeth. The clutch member 22 moves here as a consequence of the tension of the corrugated spring 26 in the direction of the synchronizer body 4, while the sliding sleeve moves in the opposite direction as a consequence of the force transmitted by the stop bolt. The sliding sleeve 8 can move until abutting on the outer synchronizer ring 30. The torque transmission from the gear wheel 42 to the shaft 352 is thus produced via the clutch member 22, the sliding sleeve 8 and the synchronizer body 4 (see FIG. 7).

Figure 8A:
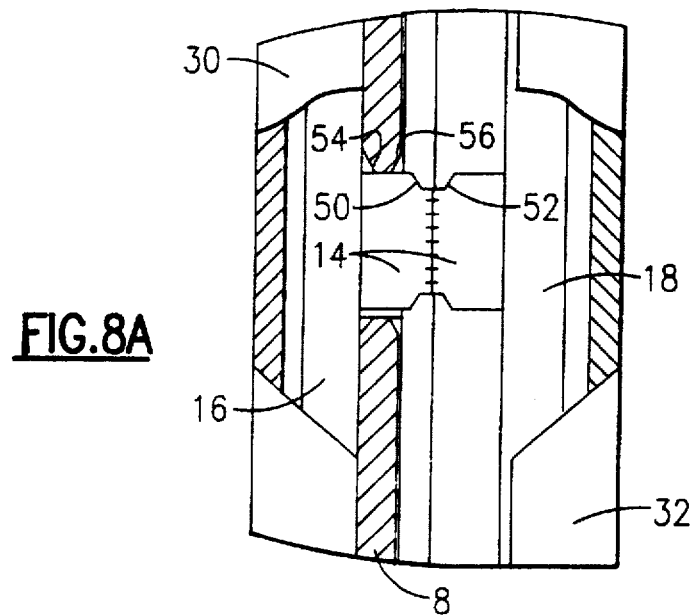
FIG. 8A is a fragmented circumference cross sectional view of the transmission shift system of the invention in its disengaging position, along section line 8A—8A of FIG. 8B.
Figure 8B:
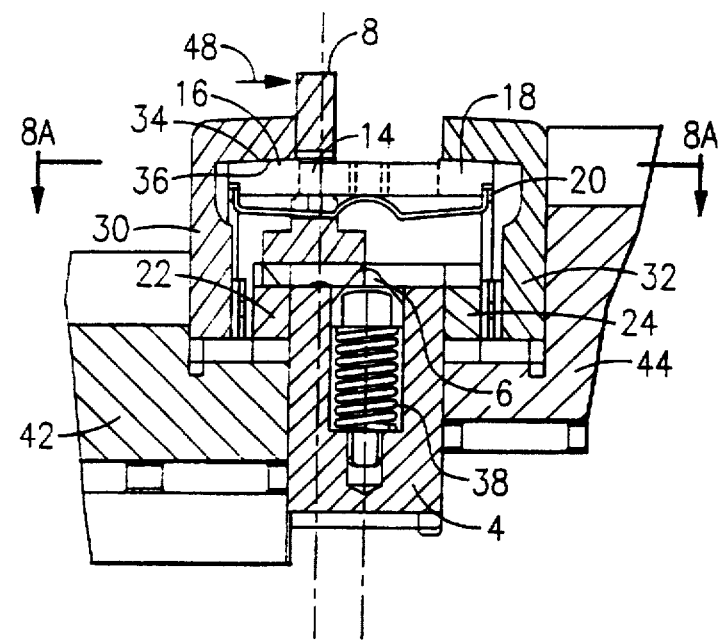
FIG. 8B is a fragmented cross-section of transmission shift system in its disengaging position.

If, for disengaging the gear, the sliding sleeve 8 is moved in a direction toward neutral, the stop bolt 6 must be moved against the compression spring 38 (FIG. 8). For this a gearshift force 48 is needed to disengage the gear. In addition, the sliding sleeve 8 moves the inner synchronizer rings 16 and 18, as a result of the leaf springs 20, in a direction toward the central position of the sliding sleeve 20.

Contrary to the former transmission shift systems, the meshing in the torque-transmitting teeth is no longer left to the driver. For him the gearshift is terminated when either the clutch member 22, 24 together with the corrugated springs 26, 28 butt on the outer synchronizer ring 30, 32, or the sliding sleeve 8 butts on the outer synchronizer ring 30, 32, there having already occurred in the second case a premature meshing of the clutch member 22, 24 in the sliding sleeve 8. A reaction on the control system and on the driver's hand in the form of force peaks due to rejection of the sliding sleeve when meshing no longer occurs.

FIG. 9 shows the cycle of the gearshifting force plotted over the gearshift stroke in a comparison of the shift systems 354 known already and 356 according to the invention.

It is to be clearly understood in the first place that the gearshift stroke of the transmission shift system according to the invention is terminated already after about 7 mm while known transmission shift systems require a stroke of 10 mm.

The gearshift forces also drop out differently. In the range between about 1.0 mm and 2.6 mm of the gearshift stroke, the gearshift force of the transmission shift system according to the invention is about 40% less than formerly required. The gearshift force peaks in the course of the known transmission shift system are generated in the range between 4 mm and 6 mm by the butting of the coupling teeth and by the turning of the clutch member. According to the idea of the invention, said elements do not impair the gearshifting characteristics for the driver. The slight increase of the gearshift force in the range of about 6 mm of the gearshift stroke is to be attributed to the detention of the ratchet device, but it is negligible compared to the former gearshift force peaks. The cycle of the gearshift force is to be regarded only as an example for the use of the invention.

Depending on the size of the gear wheels to be engaged, there opens another advantageous embodiment of the invention in the sense that the outer synchronizer rings are eliminated and replaced by adequately designed inner friction surfaces integrated in the gear wheels. Should it be required, further reduction of the axial installation space is possible here.

The other figures show possible embodiments of the basic invention. In all cases both the arrangement of separate, outer synchronizer rings and the integration of the friction and stop surfaces in the respective gear wheels are possible.

FIG. 10 to FIG. 21 thus show other arrangements of the individual parts of the synchronization wherein different manners of torque transmission are possible.

Figure 10:
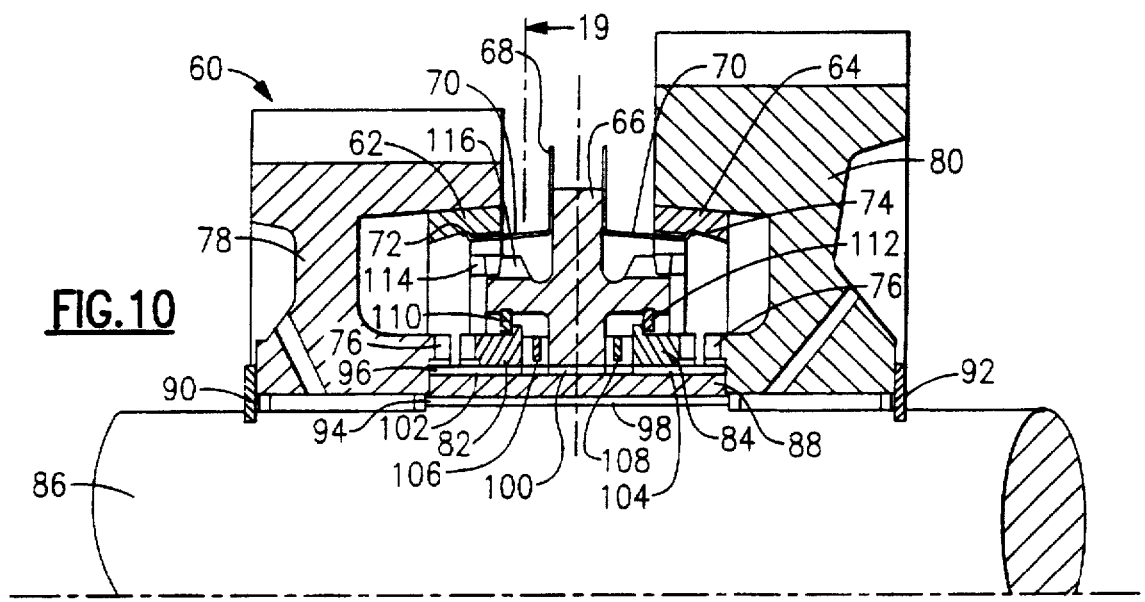
FIG. 10 is an alternative construction departing from a synchronization mechanism for a gearshift transmission.

FIG. 10 shows an alternative construction departing from a synchronization mechanism for gearshift transmissions according to German patent 24 20 206. In German patent 24 20 206 it is proposed to couple both synchronizer rings 62, 64 of the synchronizing mechanism 60 by a steel rim 68 fastened on the sliding sleeve 66. The steel rim 68 here has several substantially paraxial, radial spring tabs 70, the bent or rounded free ends of which abut with prestress in a respective circular groove 72, 74 placed in the synchronizer ring 62, 64. The two-part sliding sleeve of German patent 24 20 206 has outer coupling teeth with faceted bridging surfaces on both sides.

In comparison to said patent the embodiments according to this invention have stub coupling teeth 76 which, being spring loaded after speed equality of gear wheels 78, 80 and clutch disc 82 is reached, connect the elements 78 and 82 or 80 and 84 to be coupled. In FIG. 10, in a synchronizing mechanism 60, a ring gear 88 is situated upon a transmission shaft 86 between the gear wheels 78 and 80. The gear wheels 78 and 80 are axially fixed by fastening elements 90, 92 and the ring gear 88, but freely rotatable upon the shaft 86. The ring gear 88 has inner teeth 94 and outer teeth 96. With the inner teeth 94 the ring gear 88 meshes in outer teeth 98 of the shaft 86. The outer teeth 96 of the ring gear 88 are engaged with inner teeth 100 of the sliding sleeve 66 and with inner teeth 102 and 104 of the clutch discs 82 and 84. An elastic element 106, 108 is provided, for example, as a corrugated spring, between the clutch discs 82, 84 and the sliding sleeve 66. Upon movement of the sliding sleeve 66, the clutch discs 82, 84 are dragged in an axial direction by ring-shaped elements 110, 112. A movement to the left of the sliding sleeve 66 thus causes the ring-shaped element 112 situated to the right to also move, to the left, the clutch disc 84 situated to the right. The sliding sleeve 66 here moves, via the left elastic element 106, the left clutch disc 82 to the left until the coupling teeth 76 flatly butt, or the coupling teeth 77 of gear wheel 78 and clutch disc 82 have already accidentally meshed into each other. If the meshing has not accidentally occurred already, the left elastic element 106 is loaded against its tension force and holds under prestress the teeth of the coupling teeth 76.

Before the coupling teeth 76 are in position to mesh or before the stub teeth of the coupling teeth 76 can butt, a synchronous speed of gear wheel 78 and clutch disc 82 must be obtained. When introducing the gearshift movement to the left toward the gear wheel 78, the sliding sleeve 66 and the steel rim 68, the same as the synchronizer rings 62 and 64 held by the steel rims 68, move with slight play upon the gear wheel 78 until the conical friction surfaces of the synchronizer ring 62 and the gear wheel 78 abut on each other. Upon further movement, the spring tabs 70 slide out of the groove 72 of the synchronizer ring 62, and the spring tabs 70 are radially inwardly pressed against their prestress force. For this it is necessary to overcome a predetermined resistance force conditioned by the number and design of the spring tabs 70 and the shape of the groove 72. The resistance force transmits itself as an axial compressing force from the spring tabs 70 to the synchronizer ring 62 and from there to the friction surfaces. Thereby, prior to occurrence of the synchronous speed, a specific friction torque is exerted upon the synchronizer ring 62 which turns the latter to a locking position. The turning back of the synchronizer ring 62 from the locking position to the meshing position occurs only after the synchronous speed has appeared through the faceted transition surfaces of the locking teeth, which is formed by the locking teeth 114 on the synchronizer ring 62 and the locking teeth 116 on the sliding sleeve 66. The turning between sliding sleeve 66 and synchronizer ring 62 is limited by stops 118 and 120 which result from apertures of the synchronizer ring 62 for passage of the spring tabs 70 (see FIG. 19).

Figure 11:
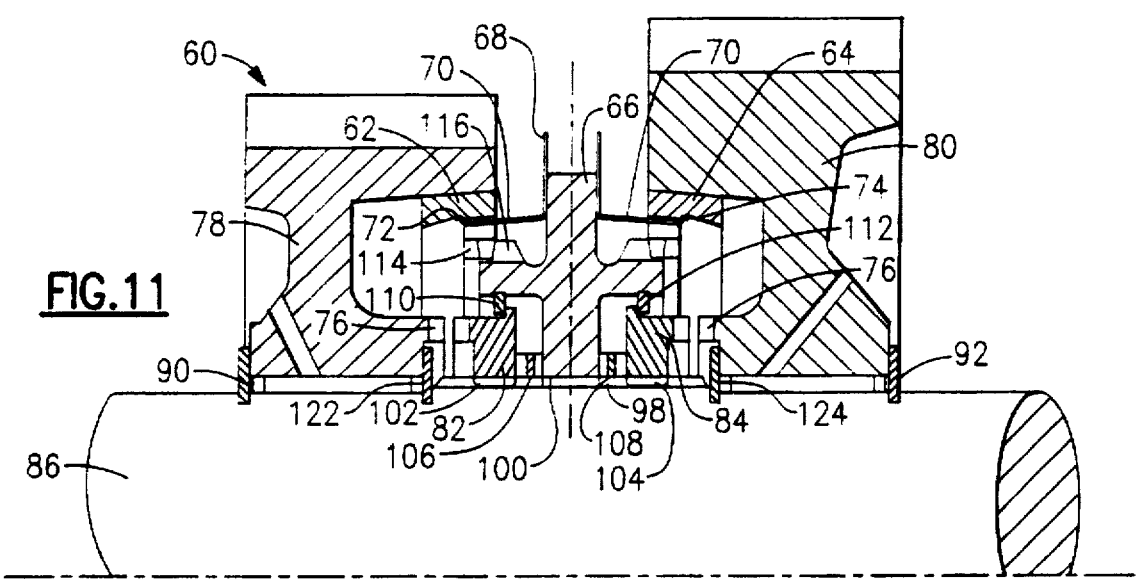
FIG. 11 is an altered embodiment of the transmission shift system of FIG. 10.

FIG. 11 shows an altered representation of the transmission shift system of FIG. 10. The inner teeth 100 of the sliding sleeve 66 and the inner teeth 102 and 104 of the clutch discs 82 and 84 mesh directly with the outer teeth 98 of the shaft 86. The gear wheels 78 and 80 are axially retained on the shaft 86 by fastening elements 90, 92, 122 and 124. Said fastening means 90, 92, 122, 124 are designed, for example, as snap rings fixed in corresponding recesses of the shaft 86.

Figure 12:
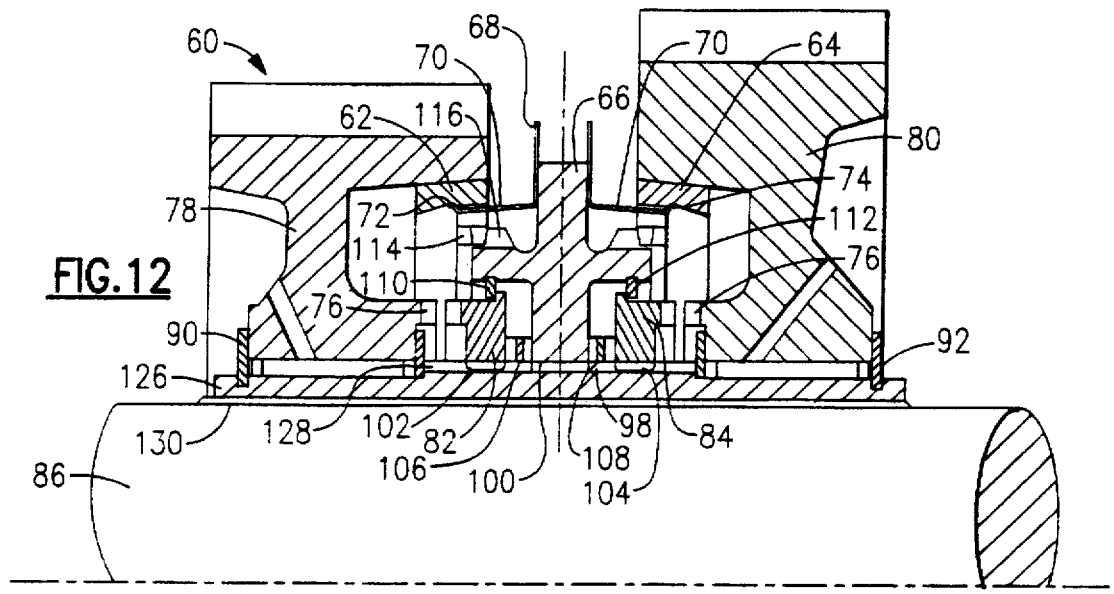
FIG. 12 is an alternative development of the invention where a ring gear is situated between the shaft and other elements of the synchronizing arrangement.

FIG. 12 shows another development. The development of FIG. 11 has been changed here in the sense that a ring gear 126 is situated between the shaft 86 and the other elements of the synchronizing arrangement 60. The ring gear 126 is shaped so as to have on the outer surface a zone without teeth upon which the gear wheels 78 and 80 are freely rotatably supported about the shaft 86. On one zone of the outer surface, the ring gear 126 has outer teeth 128. The inner teeth 100 of the sliding sleeve 66 and the inner teeth 102, 104 of the clutch discs 82 and 84 mesh with said outer teeth 128. Inner teeth 130 of the ring gear 126 grip in the outer teeth 98 of the shaft 86.

Figure 13:
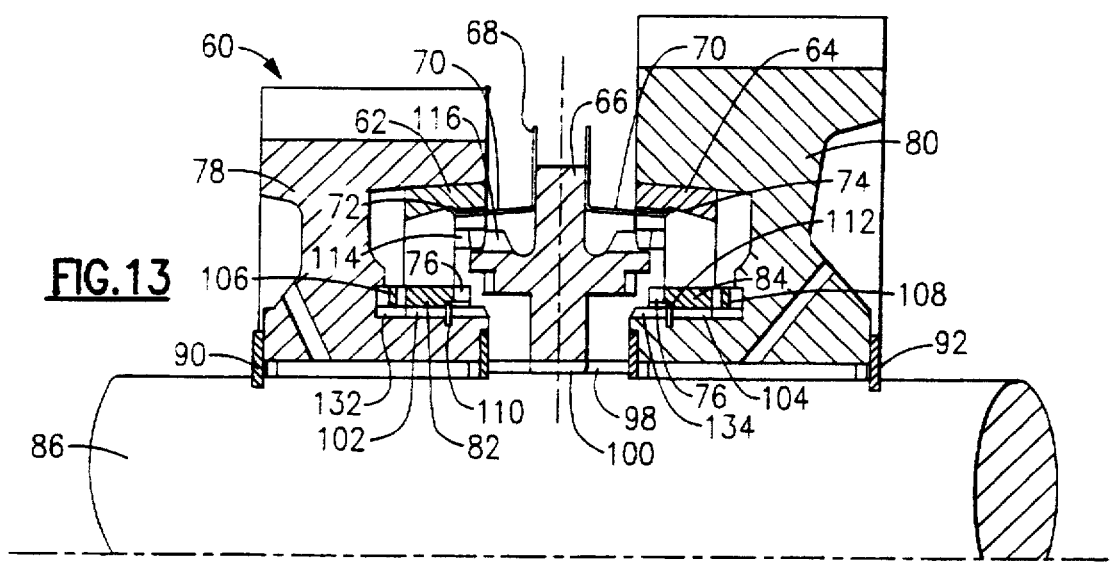
FIG. 13 is a further development of the invention where the clutch disks with their inner teeth are axially movable upon a respective teeth of the gear wheel.

FIG. 13 shows a development of the invention where, departing from an arrangement according to FIG. 11, the clutch discs 82 and 84, with their inner teeth 102 and 104, are axially movable upon respective teeth 132 and 134 of the gear wheel 78 and 80 and intermesh. The elastic elements 106 and 108 are disposed here between the gear wheels 78, 80 and the clutch discs 82, 84. The fastening elements 110 and 112 here fix the clutch discs 82, 84 in relation to the respective gear wheels 78 and 80. The coupling teeth are formed here by teeth 76 on the clutch discs 82, 84 and on the sliding sleeve 66. The gear wheels 76, 78 have, in this development, coupling teeth 76. The coupling teeth 76 provided are not dampened here in relation to the sliding sleeve 66, but to the gear wheels 78, 80.

Figure 14:
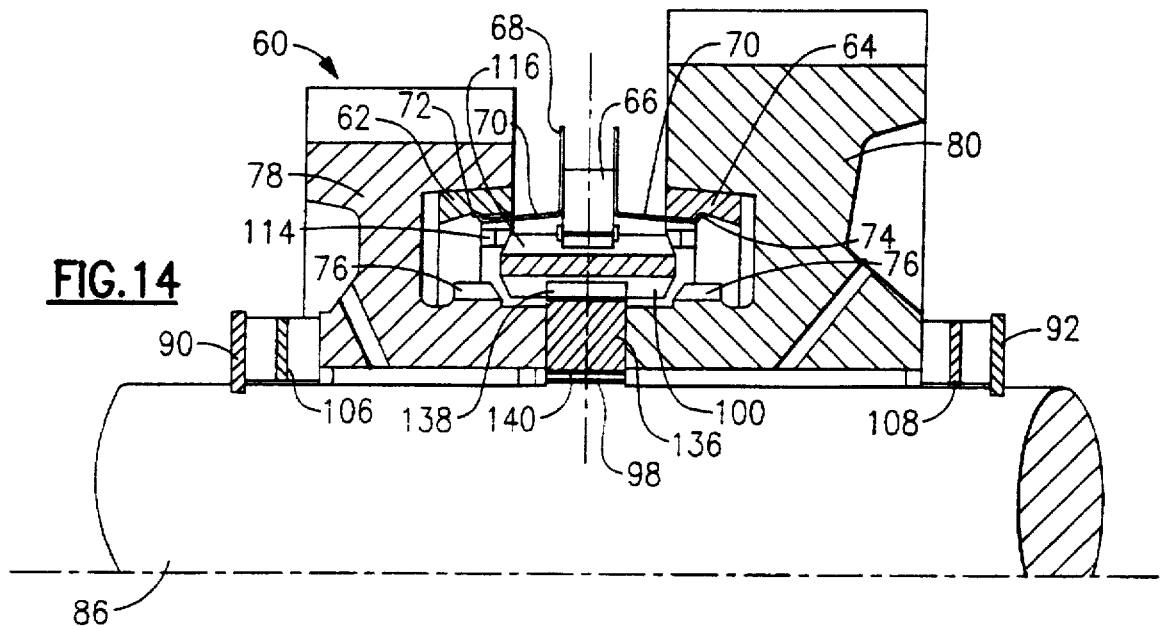
FIG. 14 is another development of the invention where the coupling teeth are dampened by interposing a complete gear wheel.

As shown in FIG. 14, it is also possible to dampen the coupling teeth 76 by interposing the complete gear wheels 78, 80. In this development, the elastic elements 106, 108 are situated outside the gear wheels 78, 80 and press the gear wheels 78, 80 on each other in an axial direction. Between both wheels 78, 80 a ring gear 136 is provided which limits the axial movement of the gear wheels 78, 80. The ring gear has outer teeth 138 and inner teeth 140. The outer teeth 138 mesh with the inner teeth 100 of the sliding sleeve 66 which is designed here, for example, with two parts. The inner teeth 100 of the sliding sleeve 66 form here, at the same time, part of the coupling teeth 76. The other part of the coupling teeth 76 is situated on the gear wheels 78, 80. The inner teeth 140 of the ring gear 136 mesh with the outer teeth 98 of the shaft 86. The elastic elements 106, 108 abut on one side on the gear wheels 78, 80 and on the other on the fastening elements 90, 92, and rest on said fastening elements 90, 92.

Figure 15:
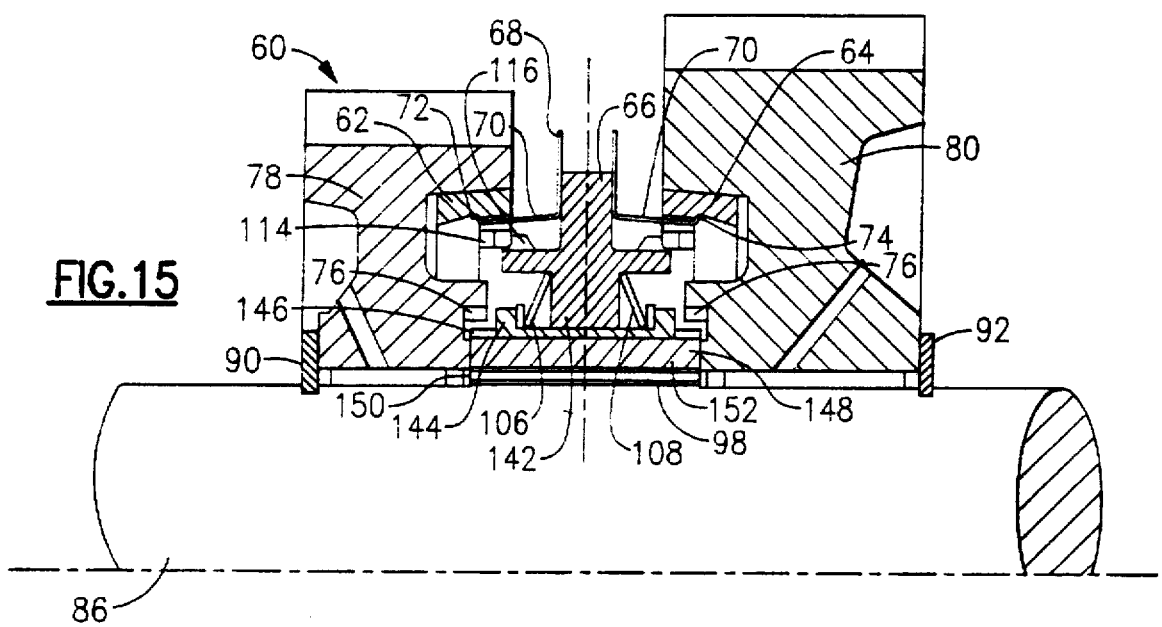
FIG. 15 is a further development of the invention where the sliding sleeve has two parts.

FIG. 15 shows another development. The sliding sleeve 66 also has two parts here. The radially outward part 142 can slide axially upon the radially inward part 144 and around the shaft 86. The radially inward part 144 of the sliding sleeve 66 is connected by inner teeth 152 with the outer teeth 146 of a ring gear 148 which in turn meshes by its inner teeth 150 with the outer teeth 98 of the shaft 86. The gear wheels 78, 80 are axially fixed by said ring gear 148 and the fastening elements 90, 92. In this design the coupling teeth 76 are formed on one side by the gear wheels 78, 80 and on the other by the radially inward part 144 of the sliding sleeve 66. Upon axial movement of the radially outward part 142 of the sliding sleeve 66, said part 144 is moved along via the elastic elements 106, 108 in the corresponding axial direction. In this design the elastic elements 106, 108 can be, for example, spring discs.

Figure 16:
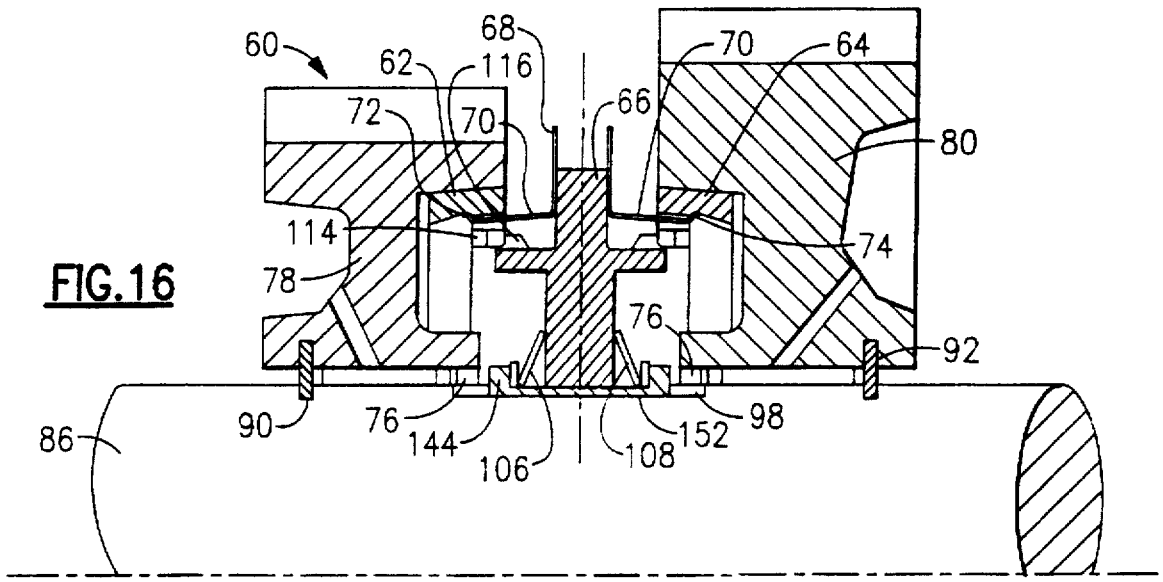
FIG. 16 is a further development of the invention where a spring disk can be used as an elastic element.

Spring discs can likewise be used as elastic elements 106, 108 according to the development in FIG. 16. Contrary to FIG. 15, the inner teeth 152 of the axially inward part 144 of the sliding sleeve 66 here mesh directly with the outer teeth 98 of the shaft 86.

Figure 17:
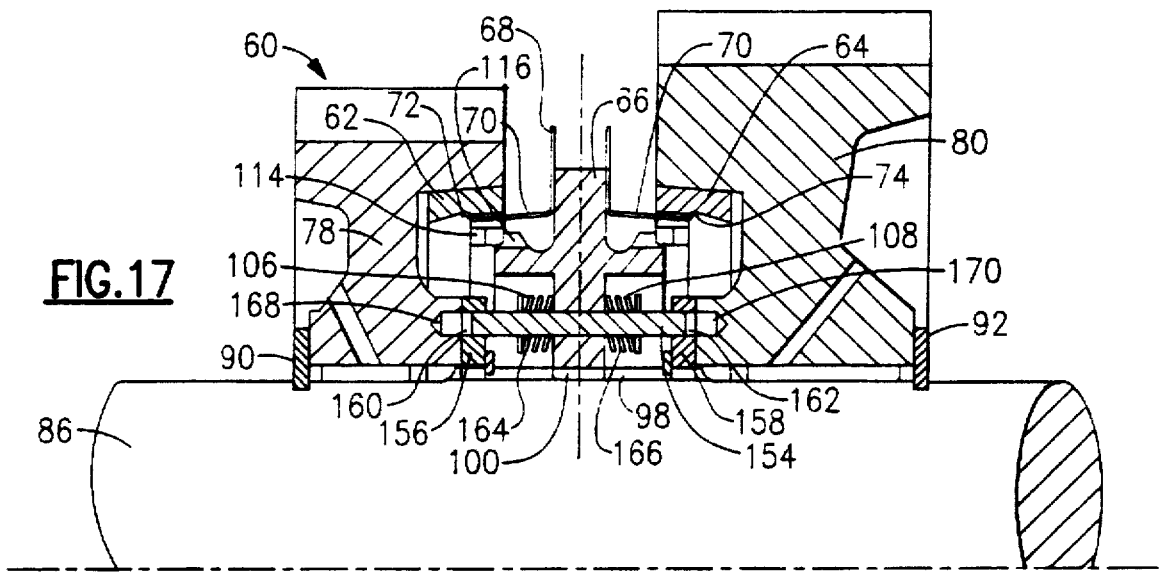
FIG. 17 is a further development of the invention where the gear wheel and shaft are connected with positive engagement by bolts.

FIG. 17 shows another development of the invention wherein the gear wheel 78, 80 and the shaft 86 are connected with positive engagement by bolts 154. Said bolts 154 are axially movably provided in the sliding sleeve 66, being limited in their axial movement relative to the sliding sleeve 66 by elastic elements 106, 108. In this embodiment such elastic elements 106, 108 can be coil springs which surround the bolts 154. Distributed around the shaft 86 are several such bolts 154. Discs 156, 158 are provided between the sliding sleeve 66 and the gear wheels 78, 80 to support the torque transmission. Through said discs 156, 158 the bolts 154 penetrate in the corresponding recesses 160, 162. The bolts 154 interact with the sliding sleeve 66 via the elastic elements 106, 108, there being provided in the bolts 154 fastening elements 164, 166 in the form, for example, of snap rings. The elastic elements 106, 108 then lie between the sliding sleeve 66 and a respective fastening element 164, 166. Recesses 168, 170 are provided in the gear wheels 78, 80 to lodge the bolts 154. When the sliding sleeve 66 moves, for example, to the left, the bolts 154 are moved to the left via the elastic element 106 and the fastening element 164. The bolts 154 at the same time penetrate the recesses 160 in the disc 156 and abut on the gear wheel 78 after synchronous speed has been obtained between sliding sleeve 66 and gear wheel 78. If the bolts 154 and the recesses 168 accidentally confront each other already in the gear wheel 78, then the bolts 154 can mesh with the recesses 168. If the bolts 154 and recesses 168 do not confront each other, then the elastic element 106 is prestressed upon abutment of the bolts 154 on the gear wheel 78 so that the bolts 154 can mesh with the recesses 168 as soon as the gear wheel 78 turns, for example, due to drag torques. The sliding sleeve 66 no longer needs to be moved for this. The driver perceives nothing of the subsequent meshing.

Figures 18, 19, 20:
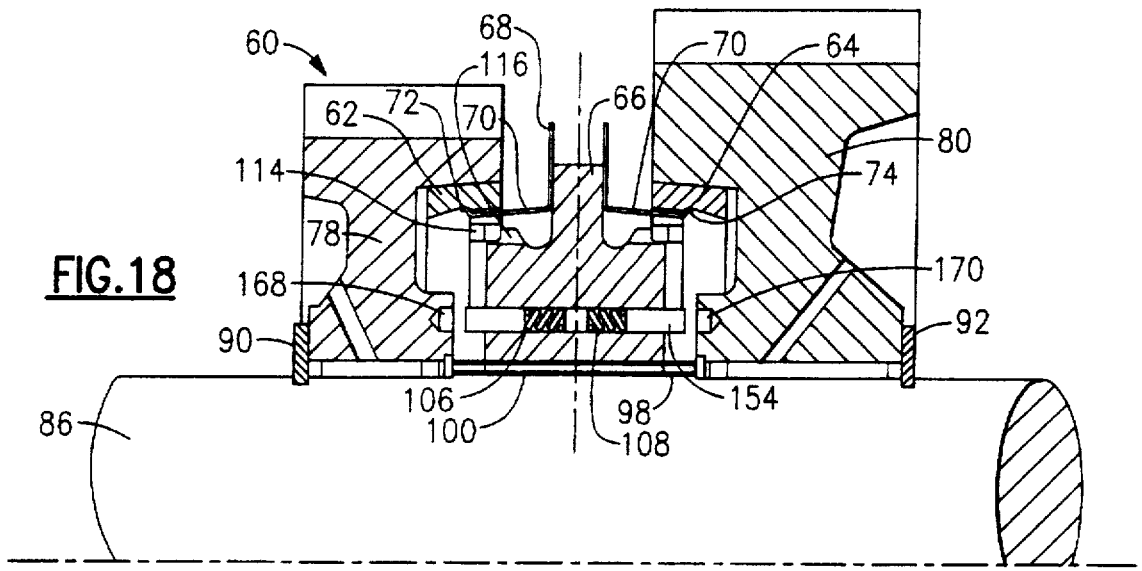
FIG. 18 is a development of the invention where the bolts can be dampened by elastic elements situated within the sliding sleeve.
FIG. 19 is a cross-section according to FIG. 10.
FIG. 20 is a triple synchronization carried out by installing two intermediate rings.

In a wider sliding sleeve 66, developed according to FIG. 18, the bolts 154 can be dampened with elastic elements 106, 108 situated within the sliding sleeve 66. The elastic elements 106, 108 can be designed as coil springs. In a wide sliding sleeve 66, discs to assist torque transmission can be omitted. The bolts 154 can mesh immediately in recesses 168, 170 in the gear wheels 78, 80 after synchronous speed of the sliding sleeve 66 and the gear wheel 78 or 80 has been obtained.

FIG. 20 departs from the development of the invention in FIG. 1 to FIG. 8. A triple synchronization is carried out here by installing two intermediate rings 172, 174. The first radially inner intermediate ring 172 is non-turnably but axially movably connected with the outer synchronizer ring 30. The second radially outer intermediate ring 174 is non-turnably but axially movably connected with the sliding sleeve 8. Three friction coatings lie together on outer synchronizer ring 30, first intermediate ring 172, second intermediate ring 174 and sliding sleeve 8. An increased synchronizer torque can be obtained with a similar coating surface by the design of an outer cone synchronizer arrangement and by the use of three friction coatings.

Figure 21:
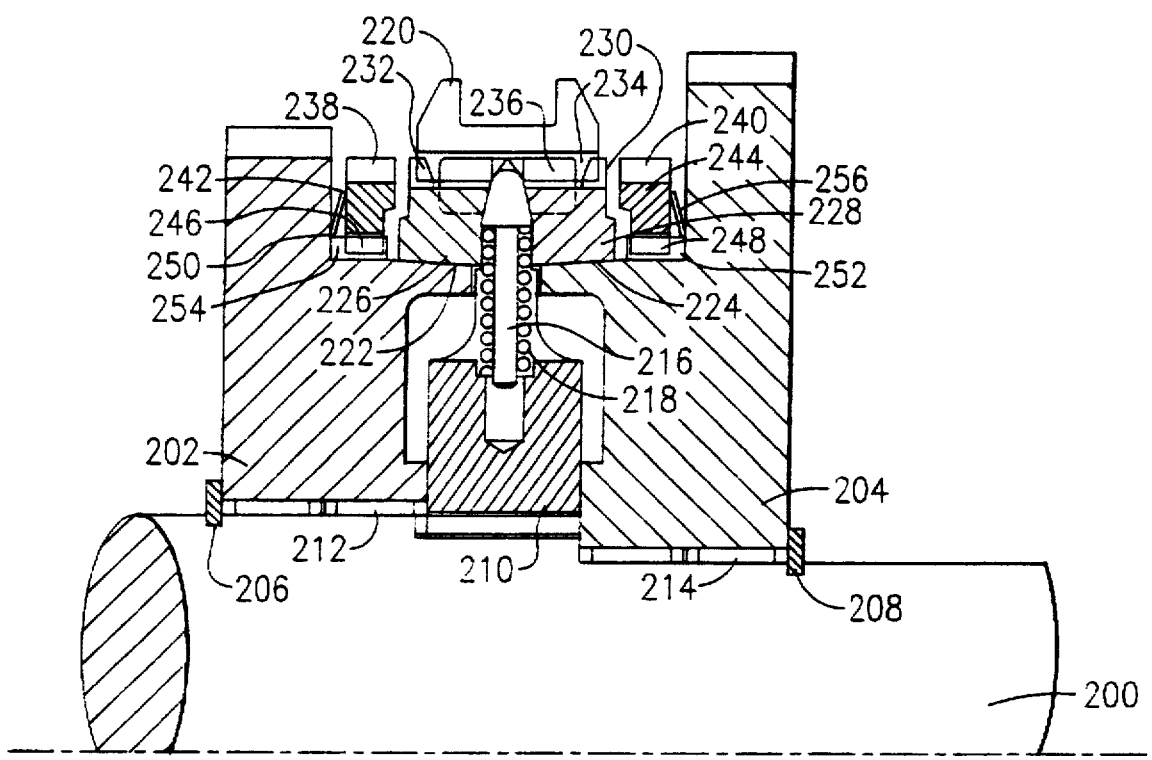
FIG. 21 is further development of the invention where a shaft has two gear wheels fixed axially upon the shaft.

FIG. 21 shows another development of the invention. On a shaft 200 two gear wheels 202 and 204 are provided which are fixed axially upon the shaft 200 by fastening elements 206, 208 and by the synchronizer member 210 lying between the gear wheels 202, 204. The gear wheels can freely rotate in a peripheral direction for which they are supported by bearings 212, 214 upon the shaft 200.

In the synchronizer member 210, situated with positive engagement upon the shaft 200, stop bolts 216 are provided which are pressed against a sliding sleeve 220 by elastic elements 218. On the gear wheels 202, 204 conical friction surfaces 222, 224 are placed which correspond to conical friction surfaces on synchronizer rings 226 and 228. The synchronizer rings 226, 228 have locking teeth 230, 232 which stand opposite to locking teeth on the sliding sleeve 220. The inner teeth 234 of the sliding sleeve 220 mesh with outer teeth 236 of the synchronizer member 210. The inner teeth 234 likewise can mesh with outer teeth 238, 240 on clutch members 242, 244 situated between the synchronizer rings 226, 228 and the gear wheels 202, 204. The inner teeth 234 are stub-ended the same as the outer teeth 238, 240. The inner teeth 246, 248 of the clutch member 242, 244 mesh with outer teeth 250, 252 on the gear wheels 202, 204. The clutch members 242, 244 are dampened by elastic elements 254, 256 in a direction toward the sliding sleeve 220.

The gearshifting movements shown and described can be carried out both by a vehicle driver and by an automatic gearshifting mechanism in an automated gearshift transmission.

The transmission shift systems described stand out by requiring a slight gearshift force with great locking security. The gearshift feel for the driver is improved, and the gearshift force cycle turns out uniformly.

Unlike in the existing transmission shift systems, the gearshift forces can be reduced by the transmission shift system according to the invention. With an equal gearshift stroke on the gearshift lever, the necessary gearshift force diminishes by about 40%. This gearshift force reduction results from the shortening of the gearshift stroke and an enlargement of the diameter of the friction cone.

The gearshift stroke of the novel transmission shift system could be reduced, as a result of the stub-ended meshing teeth, from 10 mm to 7 mm. The ratio of the gearshift linkage can be raised by 40% without increasing the gearshift stroke on the gearshift lever. The reduction of gearshift force as a result of the changed linkage ratio thus amounts to about 30%.

The requirement placed on a transmission gearshift that a positively engaged connection between the shaft and gear wheel should be possible, even when the synchronization function breaks down, and that it must be possible for the driver to obtain, with increased manual force, the meshing of the clutch member, even at high speed differences independently of the detent mechanism, has been met. Between the "holding position" and the engaged state a gearshift reserve of about 1 mm is available. Thus, in case of a failed function, the synchronizer stack can be engaged with stub-ended meshing teeth like a dog clutch engagement.

Together with the here described elastic elements 26, 28, 108, 254 and 256, any other elastic elements capable of absorbing the energy introduced by means of the gearshift force can take care of the task of the elastic elements discussed. Said elastic element here must not be in the immediate proximity of the synchronizer mechanism. It is also possible that the elastic element be part of the gearshift linkage or be situated thereon. Elastic elements considered are, for example, spring discs, corrugated discs, pneumatic springs, torsion springs, rubber elements, etc. The torsion springs can here be shaped so as to effect at the same time on the coupling teeth not only an axial dampening, but also a turning of the coupling teeth.

To avoid rattling noises in the transmission, the elastic elements can be kept under a certain prestress which prevents an undesired free play of the elements of the synchronizer mechanism.

The invention is not limited to the arrangements set forth here. It also covers all of the modifications familiar to the expert in this field and which involve the fundamental idea of the invention. The claims contain a convenient combination of the solution features. The expert will also consider other combinations in accordance with the existing problem.

| Reference numerals |
| --- |
| 2 lock synchronizing arrangement |
| 4 synchronizer member |
| 6 stop bolt |
| 8 sliding sleeve |
| 10 axis |
| 12 recesses |
| 14 projections |
| 16 inner synchronizer ring |
| 18 inner synchronizer ring |
| 20 leaf spring |
| 22 clutch member |
| 24 clutch member |
| 26 corrugated spring |
| 28 corrugated spring |
| 30 outer synchronizer ring |
| 32 outer synchronizer ring |
| 34 friction surface |
| 36 friction surface |
| 38 compression spring |
| 40 welded seam |
| 42 gear wheel |
| 44 gear wheel |
| 46 locking teeth |
| 48 gearshift force |
| 50 locking surface |
| 52 locking surface |
| 54 locking surface |
| 56 locking surface |
| 58 tension |
| 60 synchronizer mechanism |
| 62 synchronizer ring |
| 64 synchronizer ring |
| 66 sliding sleeve |
| 68 steel rim |
| 70 tab |
| 72 groove |
| 74 groove |
| 76 coupling teeth |
| 78 gear wheel |
| 80 gear wheel |
| 82 clutch disc |
| 84 clutch disc |
| 86 transmission shaft |
| 88 ring gear |
| 90 fastening element |
| 92 fastening element |
| 94 inner teeth |
| 96 outer teeth |
| 98 outer teeth |
| 100 inner teeth |
| 102 inner teeth |
| 104 inner teeth |

| Reference numerals |  |
| --- | --- |
| 106 | elastic element |
| 108 | elastic element |
| 110 | ring element |
| 112 | ring element |
| 114 | locking teeth |
| 116 | locking teeth |
| 118 | stop |
| 120 | stop |
| 122 | fastening element |
| 124 | fastening element |
| 126 | ring gear |
| 128 | outer teeth |
| 130 | inner teeth |
| 132 | teeth |
| 134 | teeth |
| 136 | ring gear |
| 138 | outer teeth |
| 140 | inner teeth |
| 142 | part of the sliding sleeve |
| 144 | part of the sliding sleeve |
| 146 | outer teeth |
| 148 | ring gear |
| 150 | inner teeth |
| 152 | inner teeth |
| 154 | bolt |
| 156 | disc |
| 158 | disc |
| 160 | recess |
| 162 | recess |
| 164 | fastening element |
| 166 | fastening element |
| 168 | recess |
| 170 | recess |
| 172 | intermediate ring |
| 174 | intermediate ring |
| 200 | shaft |
| 202 | gear wheel |
| 204 | gear wheel |
| 206 | fastening element |
| 208 | fastening element |
| 210 | synchronizer member |
| 212 | bearing |
| 214 | bearing |
| 216 | stop bolt |
| 218 | elastic element |
| 220 | sliding sleeve |
| 222 | conical friction surface |
| 224 | conical friction surface |
| 226 | synchronizer ring |
| 228 | synchronizer ring |
| 230 | locking teeth |
| 232 | locking teeth |
| 234 | inner teeth |
| 236 | outer teeth |
| 238 | outer teeth |
| 240 | outer teeth |
| 242 | clutch member |
| 244 | clutch member |
| 246 | inner teeth |
| 248 | inner teeth |
| 250 | outer teeth |
| 252 | outer teeth |
| 254 | elastic element |
| 256 | elastic element |
| 352 | shaft |
| 354 | gearshift force cycle of known transmission shift system |
| 356 | gearshift force cycle of transmission shift system according to the invention |

We claim:

1. A transmission shift system with a lock-synchronizing arrangement in which one synchronizer member, connected with a transmission shaft, and at least one gear wheel, rotatable at a different speed from the transmission shaft, are positively engagable via an annular sliding sleeve which is axially movable by a gearshifting force when said transmission shaft and said at least one gear wheel are at a substantially synchronized speed, said sliding sleeve having coupling teeth being meshable with corresponding coupling teeth of said at least one gear wheel, a clutch member being connected with said at least one gear wheel, and a synchronizer ring of said at least one gear wheel being restrictedly turnable in relation to said sliding sleeve, a portion of said synchronizer ring forms with a portion of said at least one gear wheel a positively engaged coupling, and, in the absence of synchronization, axial movement of said sliding sleeve is blocked by blocking surfaces of locking teeth, and said synchronizer member having a plurality of spring-loaded stop bolts provided therein;

wherein at least one of said clutch member (22, 24, 242, 244) and said at least one gear wheel (42, 44, 202, 204) has stub-ended, coupling teeth (238, 24), without any facets, which are matable with stub-ended coupling teeth (234) of said sliding sleeve (8, 220); and an elastic element (26, 28, 254, 256) is positioned to dampen said clutch teeth of at least one of said clutch member (22, 24, 242, 244) and said at least one gear wheel (42, 44, 202, 204) during an engaging motion of said sliding sleeve (8, 220).

2. A transmission shift system with a lock-synchronizing arrangement according to claim 1, wherein said synchronizer ring (16), located between said sliding sleeve (8) and said at least one gear wheel to be coupled, is connected with a second synchronizer ring (18), located between said sliding sleeve (8) and a second gear wheel to be coupled, by projections (14) on which said locking teeth are provided.

3. A transmission shift system with a lock-synchronizing arrangement according to claim 1, wherein said synchronizer ring (16, 18) and at least one other synchronizer ring (30, 32), connected with said at least one gear wheel (42, 44), have matable friction surfaces (34, 36) which form the engaged coupling.

4. A transmission shift system with a lock-synchronizing arrangement according to claim 1, wherein said synchronizer ring (16, 18) and said at least one gear wheel (42, 44) have friction surfaces (34) which form the engaged coupling.

5. A transmission shift system with a lock-synchronizing arrangement according to claim 1, wherein said synchronizer ring (226, 228) and said at least one gear wheel (202, 204), and said clutch member (242, 244) connected therewith, have friction surfaces (222, 224) which form the engaged coupling.

6. A transmission shift system with a lock-synchronizing arrangement according to claim 3, wherein said friction surfaces (34) extend radially outwardly on said synchronizer ring (16, 18) and form, with radially inward surfaces (36) of at least one of said second synchronizer ring (30, 32) and said at least one gear wheel (42, 44), the engaged coupling.

7. A transmission shift system with a lock-synchronizing arrangement according to claim 3, wherein at least one intermediate ring (172, 174) is provided, between said friction surfaces (34) on said synchronizer ring (16, 18, 226, 228) and at least one of said friction surfaces (36) on said other synchronizer ring (30, 32) and on said at least one gear wheel (222, 224), which has one radially inward friction surface and one radially outward friction surface.

8. A transmission shift system with a lock-synchronizing arrangement according to claim 1, wherein facets are provided on said stop bolts (6, 216), and said facets on said stop bolts (6, 216), in a neutral position of said sliding sleeve (8, 220), lie in notches provided in said sliding sleeve (8, 220) and, in an end position in an engaged gear, contact marginal surfaces of said sliding sleeve (8, 220).

9. A transmission shift system with a lock-synchronizing arrangement according to claim 1, wherein said synchronizer ring (16, 18) is retained, relative to said sliding sleeve (8), by a plurality of elastic elements (20).

10. A transmission shift system with a lock-synchronizing arrangement according to claim 9, wherein said plurality of elastic elements (20) are leaf springs.

11. A transmission shift system with a lock-synchronizing arrangement having a sliding sleeve non-rotatably connectable with a transmission shaft but axially movable, said sliding sleeve causing, via coupling elements, a connection between a transmission shaft and at least one gear wheel, and said at least one gear wheel has a synchronizer ring being restrictedly turnable relative to said sliding sleeve, locking teeth being located on said synchronizer ring, said locking teeth blocking further movement of said sliding sleeve when a speed difference is present between said at least one gear wheel and said sliding sleeve;

wherein said synchronizer ring is coupled with said sliding sleeve by a steel rim with several radially dampening tabs, said clutch members form coupling teeth (76) with stub-ended teeth, without any no facets, and elastic elements (106, 108) are provided which dampen said coupling teeth (76) relative to said sliding sleeve (66).

12. A transmission shift system with a lock-synchronizing arrangement according to claim 11, wherein a clutch disc (82, 84), which has the coupling teeth (76), is provided between said sliding sleeve (66) and said at least one gear wheel (78, 80).

13. A transmission shift system with a lock-synchronizing arrangement according to claim 12, wherein a gear ring (88) is provided, between said transmission shaft (86) and said sliding sleeve (66), said gear ring (88) has inner teeth (94) which mesh with the outer teeth (98) of said transmission shaft (86), and the outer teeth (96) of which mesh with the inner teeth (100) of said sliding sleeve (66) and with said clutch discs (82, 84).

14. A transmission shift system with a lock-synchronizing arrangement according to claim 13, wherein said at least one gear wheel (78, 80) to be coupled is axially fixed and freely movably supported, in a peripheral direction, upon said gear ring (88).

15. A transmission shift system with a lock-synchronizing arrangement according to claim 13, wherein said clutch discs (82, 84) are axially movably situated with their inner teeth (102, 104) upon teeth (132, 134) on said at least one gear wheel (78, 80), and said elastic element (106, 108) is provided between said at least one gear (78, 80) and said clutch disc (82, 84).

16. A transmission shift system with a lock-synchronization arrangement according to claim 11, wherein said elastic elements (106, 108) are situated axially outside said at least gear wheels (78, 80) and said at least one gear wheel (78, 80) is axially movable.

17. A transmission shift system with a lock-synchronization arrangement according to claim 11, wherein said sliding sleeve (66) comprises an radially inner part (144), which has said coupling teeth (76) and is positively engaged with said transmission shaft (86), and a radially outer part (142) of said sliding sleeve (66) is freely movable in an axial direction and in a peripheral direction upon said radially inner part (144).

18. A transmission shift system with a lock-synchronization arrangement having a sliding sleeve non-rotatably connectable with a transmission shaft but axially movable relative thereto, said sliding sleeve causing, via coupling elements, a connection between said transmission shaft and at least one coupleable gear wheel, and a synchronizer ring being restrictedly turnable relative to said sliding sleeve for each one of said coupleable gear wheels, locking teeth being provided upon each of said synchronizer rings, said locking teeth, when a speed difference is present between said coupleable gear wheels and said sliding sleeve, block further movement of said sliding sleeve, and each said synchronizer ring being coupled with said sliding sleeve by a steel rim with several radially dampening tabs;

wherein said coupling elements are bolts (154) meshable in recesses (168, 170) provided in said gear wheels (78, 80), and elastic elements (106, 108) are provided which dampen said coupling bolts relative to said sliding sleeve (66).

19. A transmission shift system with a lock-synchronization arrangement according to claim 18, wherein discs (156, 158) are provided, between the sliding sleeve (66) and gear wheels (78, 80), to assist with torque transmission, and said bolts (154) project through recesses (160, 162) into said discs (156, 158).

20. A transmission shift system with a lock-synchronization arrangement according to claim 18, wherein said elastic elements (106, 108) are coil springs.

21. A transmission shift system with a lock-synchronization arrangement according to claim 1, wherein said elastic elements (26, 28, 106, 108) are corrugated springs.

22. A transmission shift system with a lock-synchronization arrangement according to claim 1, wherein said elastic elements (26, 28, 106, 108) are spring discs.

23. A transmission shift system with a lock-synchronization arrangement according to claim 1, wherein said elastic elements (26, 28, 106, 108, 254, 256) are prestressed.

24. A transmission shift system with a lock-synchronization arrangement according to claim 1, wherein said elastic elements are at least one of part of a shift linkage and situated on the shift linkage.

25. A transmission shift system with a lock-synchronization arrangement according to claim 1, wherein the gearshift force (48) is applied by gearshift means.

26. A transmission shift system with a lock-synchronization arrangement according to claim 25, wherein said gearshift means is a pneumatically operated mechanism.

27. A transmission shift system with a lock-synchronization arrangement according to claim 25, wherein said gearshift means is an electrically operated mechanism.

28. A transmission shift system with a lock-synchronization arrangement according to claim 25, wherein the control of said gearshift means is automatically controlled.

* * * * *